United States Patent Office 3,635,852
Patented Jan. 18, 1972

3,635,852
PROCESS OF MAKING A GENERAL PURPOSE EXPANDABLE ALKENYL AROMATIC POLYMER CONTAINING DI-ALKYL POLYSILOXANE INTERNALLY
Arnold B. Finestone, Roger Miller, and Michal Niechwiadowicz, Leominster, Mass., assignors to Foster Grant Co., Inc., Leominster, Mass.
No Drawing. Continuation of application Ser. No. 667,657, Sept. 14, 1967. This application Dec. 15, 1969, Ser. No. 882,377
Int. Cl. C08j 1/26
U.S. Cl. 260—2.5 B
8 Claims

ABSTRACT OF THE DISCLOSURE

Expandable alkenyl aromatic polymer compositions are prepared by polymerizing in aqueous suspension an alkenyl aromatic monomer having mixed therein about 0.0005 to 0.05% by weight of a liquid organically disubstituted polysiloxane and thoroughly washing the resulting expandable particulate product.

---

This application is a continuation of application Ser. No. 667,657, filed Sept. 14, 1967, now abandoned.

The term alkenyl aromatic polymers includes thermoplastic polymers and copolymers containing in chemically combined form at least 55% by weight of a monoalkenyl aromatic compound having the general formula:

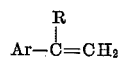

wherein Ar represents a monovalent aromatic radical and R represents hydrogen or the methyl radical. Known examples of such alkenyl aromatic resins are the solid homopolymers of styrene, ar-vinyl toluene, ar-vinyl xylene, and ar-ethylvinyl benzene; the solid copolymers of two or more of such alkenyl aromatic compounds with one another; and solid copolymers of one or more of such alkenyl aromatic compounds with a minor amount of one or more other polymerizable olefinic compounds.

Polystyrene containing pentane or the like is used in making molded articles, but for many uses it has the disadvantage of resulting in rough surfaced molded articles. Attempts to produce such compositions without this disadvantage have resulted in an undesirable decrease in important properties of the polymer, such as: poor shelf life, excessive water pick-up during pre-expansion, coarse and non-uniform cell structure in the pre-puff or individual pre-expanded particles and poor molding characteristics (poor fusion, slow setting, long cooling cycle, or collapse or post expansion of the molded article, or combinations thereof).

The foregoing and other disadvantages are substantially obviated by the present invention, an object of which is to provide new general purpose, expandable styrene polymer materials, which give smooth surfaced molded articles. A further object of the invention is to provide a process by means of which such styrene polymer materials can be prepared in a convenient way. A specific object of the invention is to provide particulate expandable styrene polymer materials containing a small amount of polysiloxane mixed therein but having the surface thereof substantially washed, and a process for the production of such styrene polymer materials. Other objects of the invention will be obvious in view of details or embodiments of the invention as set forth hereinafter.

These objects are achieved by providing styrene polymers or the like having a very small amount of liquid organically di-substituted polysiloxane intimately mixed therein. It is preferred to add the said polysiloxane to the monomeric styrene or the like and to polymerize this mixture in accordance with usual suspension polymerization methods, preferably with delayed addition of suspending agent and further delayed addition of blowing agent. In this way there is no undesirable alteration of the molecular weight or the softening range of the styrene or the like polymer material. The resulting beads are washed thoroughly, and dried.

The following examples illustrate ways in which the principles of the invention are applied, but are not to be construed as limiting its scope. The parts and percentages specified in the examples are parts and percentages by weight, unless otherwise indicated.

EXAMPLE 1

There are charged into a jacketed vessel equipped with an agitator 100 parts of distilled water. The agitation is commenced, the water temperature is raised to 195° F. and 92.19 parts of styrene, 0.025 part of dimethyl polysiloxane, 0.20 part benzoyl peroxide and 0.085 part of tertiary butyl peracetate are added thereto. The agitation is of the usual type for suspension polymerization to give beads in the diameter range of about 0.25 to 2.5 mm. About 15 minutes later, 0.05% of polyvinyl alcohol, based on the weight of the total charge, is added thereto as an aqueous solution, and polymerization is carried on at 195° F.

When about 70% of the monomer charge is converted to polymer, the reactor is pressurized with nitrogen to 15 p.s.i.g. and pentane (7.50 parts) is added thereto over a period of 10 minutes, and the reaction is continued at 195° F. for 2 hours. Then the reaction temperature is raised to 240° F. and polymerization is continued thereat for another 5 hours. Finally, the reactor charge is cooled to below 125° F., thoroughly washed with water and dried.

The product yields molded articles having a glossy surface with an attractive appearance.

The washing with water involves draining aqueous liquid from the reaction mixture, adding tap water in an amount about four times the bulk volume of the remaining solid material, vigorously agitating the resulting mixture for about 10 minutes and draining aqueous liquid. Such washing is repeated four more times, and then the solid material is dried and tested, in usual manner. Equivalent methods of thoroughly washing the product may be used.

The unique results obtained in accordance with the invention are associated with the delayed addition of suspending agent, or the thorough washing of product, or both.

COMPARATIVE EXAMPLE A

The procedure of Example 1 is repeated using no dimethyl polysiloxane. The surface of molded articles prepared from the resulting product lacks gloss and has a matty appearance.

COMPARATIVE EXAMPLE B

The procedure of Example 1 is repeated except that the dimethyl polysiloxane (0.025 part) is added when about 70% of monomer is converted to polymer and about 5 hours after addition of the suspending agent.

The product yields molded articles of good gloss, but fusion is so poor that such articles are not generally of acceptable quality, especially as to articles having sharp corners.

EXAMPLE 2

The procedure of Example 1 is repeated using 0.02 part of dimethyl polysiloxane (instead of 0.025).

The product has the same characteristics as those of the product of Example 1.

In similar runs, using 0.03 or 0.04 part of the polysiloxane, similar results are obtained.

EXAMPLE 3

The procedure of Example 1 is repeated using 0.01 part of dimethyl polysiloxane (instead of 0.025).

The product has almost the same characteristics as those of the product of Example 1.

EXAMPLE 4

The procedure of Example 1 is repeated using 0.05 part of dimethyl polysiloxane (instead of 0.025).

The molded articles prepared therefrom possess good gloss, and the fusion is generally acceptable; however, in articles having areas where three or more planes intersect the fusion is only fair.

EXAMPLE 5

The procedure of Example 1 is repeated using 0.005 part of dimethyl polysiloxane (instead of 0.025).

The product yields molded articles whose gloss is lower than that of Example 1, but the general appearance thereof is noticeably better than that of the articles molded from the product of Example A.

EXAMPLE 6

The procedure of Example 1 is repeated using 0.025 part methyl octyl polysiloxane, instead of 0.025 part of dimethyl polysiloxane.

The product has characteristics identical with those of the product of Example 1.

EXAMPLE 7

The procedure of Example 1 is repeated using 0.02 part of methyl octyl polysiloxane instead of 0.025 of dimethyl polysiloxane.

The product has the same characteristics as those of the product of Example 1.

EXAMPLE 8

The procedure of Example 1 is repeated using 0.01 part of methyl octyl polysiloxane, instead of 0.025 part dimethyl polysiloxane.

The product has characteristics very much like those of the product of Example 1.

EXAMPLE 9

The procedure of Example 1 is repeated except that polyvinyl alcohol is first added when 40% of the monomer charge is converted to polymer.

The product has characteristics identical with those of the product Example 1.

Comparable results to the foregoing are achieved by various modifications thereof, including the following. The present invention is employed to polymerize a charge consisting of at least 55%, and preferably 70 to 100%, of at least one monoalkenyl aromatic monomer compound. Up to 45% of the polymer charge can be another ethylenically unsaturated compound copolymerizable with the monovinyl aromatic compound. The monovinyl aromatic compound is preferably styrene although vinyl napthalenes, vinyl aryl compounds or their substitution derivatives may also be employed. Examples of substituted vinyl aryl compounds include: halogenated styrene such as mono- and di-chloro, mono and dibromo, or fluorostyrenes; alkyl, alkenyl, aryl, aryl-alkyl, alkyl-aryl and cycloaliphatic substituted materials, as for example mono- and dimethyl-styrene, and the ethyl-styrene. A combination of monovinyl aromatic compounds can also be employed. The ethylenically unsaturated compound copolymerizable with the monovinyl aromatic can include any of a variety of monomers known to be copolymerizable with vinyl aryl compounds. Examples thereof include the esters (preferably the alkyl esters) of acrylic acids, methacrylic acids and itaconic acid, such as ethyl acrylate, methyl methacrylate, and the like, the nitrile derivatives of acrylic and methacrylic acids, e.g., acrylonitrile, methacrylonitrile, and the like, all of which are well known in the art for the purposes of copolymerizing with monovinyl aromatic compounds. The polymerization of styrene monomer is preferred.

The amount of polysiloxane added should be at least 0.0005% and preferably at least 0.01% based on the weight of the monomer, and the upper limit is 0.05% and preferably 0.04%. Higher amounts deleteriously affect the quality of the product, and lower amounts do not give the desired improvements.

If desired, soluble resinous or elastomeric material may be dissolved in the monomer, preferably before addition of the polysiloxane, in order to provide a product having such polymeric material co-reacted therein.

The amount of polymeric material added may be at least 0.5%, based on the monomer charge and 40% is a practical upper limit. However, even higher amounts may be added if efficient agitation or mixing equipment is used. About 5 to 30% is a preferred range. The higher amounts in these ranges are indicated because shorter process cycle times may be used.

This added ingredient may be of any thermoplastic alkenyl aromatic polymer of the similar types already discussed. It may be from an identical or a different monomer or monomers of these types. Instead of beads, any convenient particulate form of polymer may be used, e.g., pellets, granules and the like.

The molecular weight is related to the viscosity of a 10% by weight solution of the polymer in toluene at 25° C. Generally, all the useful solid polymers of the alkenyl aromatic types may be made in accordance with the invention. The molecular weights thereof may be in the range of 25,000 up to 500,000 or an even wider range.

Generally, the particle size of the added polymer should be in the range of 0.05 to 10.0 mm. average diameter. Larger size particles may be used, especially with efficient mixing equipment, but are not indicated for economic and quality control reasons. Even very fine particles are suitable; e.g., of the size of dust or the like.

Preferably, the polysiloxane is added to the monomer, or to a mixture of monomer and water prior to addition of suspending agent for suspension polymerization.

For best performance, the polysiloxanes should contain di-alkyl siloxane. Among such polysiloxanes, the most available have been those with short chain aliphatic substituents and particularly the polysiloxanes derived from methyl substituted siloxanes. Copolymers with a moderate amount of a similar higher organic substituent are very effective and show little or no problem with regard to undue softening. The readily available polysiloxanes have been those which are derived from siloxanes having the general formula $R_2SiO$ or the siloxane may be a copolymer of dimethyl siloxane and a minor proportion of the units: $C_2H_5(CH_3)SiO$ or $(C_2H_5)_2SiO$; desirably such a polysiloxane containing 50 or more percent of the total R radicals therein as methyl radicals.

Among the suitable organically di-substituted polysiloxanes, there may be included those containing up to 10% of the above mentioned R groups as phenyl, cyclohexyl, higher alkyl groups, or the like.

The polysiloxanes used are normally liquid silicone fluids such as are readily available on the open market. They may be in the form of pure liquids or as solutions in organic solvents which are poor solvents for the alkenyl aromatic polymer or as aqueous emulsions of the same.

The polysiloxanes having long chain aliphatic substituents are becoming commercially available, and they too may be used in accordance with the invention. The substituents may be the same or different alkyl groups of 3 to 22 or more carbon atoms or analogous aliphatic groups which may contain one or more rings, such as cyclohexyl and the like cyloalkyl groups. Mixed compounds containing one or more short chain groups and one or more long chain groups are suitable.

In a preferred modification, the process is initiated by dispersing a solution of the polysiloxane and monomer in water, with the initial stages of the polymerization being conducted at temperatures under 100° C. preferably temperatures within the range of 70° to 95° C. It is preferred to employ polyvinyl alcohol as the suspending agent, although other conventional suspending agents can be employed, such as tricalcium phosphate or other phosphate suspending agents, calcium carbonate, carboxymethyl cellulose, hydroxyethyl cellulose, polyvinylpyrolidone, aluminum oxide, magnesium silicate, and the like, all of which are well known for this purpose. It is important to add the suspending agent after the monomer and the polysiloxane are mixed, and preferably on a delayed basis, i.e., when the conversion has reached about 20 to 55%, which normally will be about 1.5 to 5 hours after the reaction mixture reaches the desired polymerization temperature, e.g., ordinarily about 70° to 95° C. The pH of the reaction mixture may be varied depending on the suspending agent employed, e.g., pH of 5 or greater for tricalcium phosphate. When 50 to 80%, preferably 60 to 75% conversion, has been obtained, the volatile liquid blowing agent is added rapidly to the reaction system in a period of 2 to 30, preferably 5 to 20 minutes. The preferred sequence of addition is polysiloxane, later on suspending agent, and still later on the blowing agent.

Suitable volatile liquid blowing agents generally having boiling points of from about 15° to approximately 100° C. are employed. Such agents are well known in the art. "Petroleum ethers" are particularly preferred, with those boiling within the range of 35° to 65° C. conventionally known as the "pentane" fraction being especially suitable. Such a fraction generally contains at least 70% normal pentane. Petroleum ethers boiling in the range of 65° to 72° C. denoted as the "hexane" fraction and those boiling in the range of 95° to 100° C. denoted as the "heptane" fraction, may also be used. Similarly useful are pure hydrocarbons boiling in the range of 15° to 100° C., such as for example, pentane, hexane, heptane cyclopentane, and the like, or mixtures of such hydrocarbons as occur in the petroleum ether fractions.

The volatile organic compound can be a liquid or gas at ordinary temperatures and pressures, i.e., at atmospheric conditions. The compound should be a nonsolvent or poor solvent of the polymer. It should have a molecular weight of at least 56 or greater and a molecular size such that it does not readily diffuse from the solid polymer.

The product generally has 3 to 10, preferably 4 to 8% of the volatile blowing agent incorporated therein. The quantity of blowing agent can be varied and is sufficient to cause the desired degree of expansion by the end users. Since there is generally little loss of volatile blowing agent, the amount of blowing agent added is about 3 to 10 weight percent of the monomer employed.

Just prior to the addition of the volatile liquid blowing agent, the reactor may be pre-pressured with an inert and non-condensable gas to insure avoidance of undesired porosity or voids in the polymer particles. Alternatively this pressurization may be effected immediately after the addition of the volatile liquid blowing agent and before the bulk of the blowing agent has been absorbed by the polymer beads.

Thereafter the second stage of the polymerization is effected at temperatures of about 95° C. or above, desirably in the range of 95° to 145° C. especially 95° to 140° C.

As is conventional, a catalyst or initiator is added to promote the first stage polymerization. Typical examples of such initiators are benzoyl peroxide and its derivatives, such as para-chlorobenzoyl peroxide, and the like. To help catalyze the second stage of the polymerization further amounts of peroxide catalysts may be added to the polymerization zone. The second stage catalyst may be added at the beginning or at the latter part of the first stage polymerization, and preferably the peroxide catalyst is added along with the blowing agent, especially if the catalyst is soluble in the blowing agent. If the initiator is benzoyl peroxide or a similar initiator which readily reacts at temperatures under 100° C., the initiator for the second stage of polymerization must be added at or about the beginning of the second stage for catalysis of the second stage polymerization to be effective.

However, in another embodiment of the present invention, a second catalyst having a half-life value considerably higher than that of benzoyl peroxide can be used to promote the second stage reaction. In this embodiment, the second stage catalyst has a half-life value of more than 1 hour at 100° C. in benzene (preferably about 3 hours, in contrast to the 0.4 hour half-life value of benzoyl peroxide at 100° C. in benzene). In this embodiment the catalyst can be added at the beginning of polymerization or prior to the second stage reaction, since it will not substantially decompose at temperatures of 80° to 95° C. as used in the first stage polymerization, but will only exercise its catalytic effect at the higher temperatures (which characterize the second stage of polymerization).

Examples of such preferred second stage catalysts are tertiary butyl peracetate, cyclohexanone peroxide, 2,5-dimethyl-2,5-bis (benzoyl peroxy) hexane, di-tertiary butyl peroxide, di-tertiary butyl diperphthalate, methyl ethyl ketone peroxide, dicumyl peroxide, hydroxyheptyl peroxide, and the like.

The second stage polymerization which takes place generally at temperatures of 95° C. to 145° C. is conducted to effect virtually 100% complete conversion. After completion of the polymerization, the polymerization mixture is cooled in the reactor so as to preclude premature expansion of the expandable particles upon discharge from the reactor. The products formed in accordance with the present process are polymer beads, capable of expansion upon heating with steam, or the like. The beads may then be removed from the polymerization mixture, washed thoroughly, and dried following conventional techiques. The product may be of any usual bead type or the like as to particle size. A suitable range is 0.25 to 2.5 mm. average diameter.

Where all the advantages of the invention are not required, alternative polymerization procedures may be used, as known in the art, including bulk polymerization with simultaneous addition of polysiloxane and with simultaneous or supplemental addition of blowing agent, and comminution in known manner of any solid material if desired, and washing if needed.

In general the first stage polymerization is conducted at temperatures of less than 100° C. and is effected for periods of 2 to 10 hours, depending upon catalyst, to obtain 50 to 90% conversion. The second stage polymerization is preferably conducted at temperatures above about 95° C. to complete the polymerization after addition of the volatile liquid blowing agent, and is generally effected over a period of 1 to 10, preferably 3 to 5 hours, as required.

If desired, anti-coalescing agents and the like may be included. The anti-coalescing agents are selected so that they do not have a deleterious affect on the expanded resin particles or the final product. Examples of such anti-coalescing agents are magnesium stearate, zinc stearate, calcium stearate, sodium stearate, aluminum stearate, butyl stearate, stearic acid, sodium oleate, talc, tricalcium phosphate, potassium lauryl sulfate, diatomaceous earth, and combinations of two or more thereof.

Polymerization of the monomers can be effected in the presence of various other agents to provide an ultimate polymer product containing such an agent or agents. Examples of such other agents include dyes, plasticizers and the like.

As known in the art, general purpose polymer materials do not have hologen-containing additives. The self-extinguishing type materials, such as those containing organic bromide additives, are not regarded as general purpose materials.

Having described the present invention, that which is sought to be protected is set forth in the following claims.

We claim:

1. In a process for preparing an expandable alkenyl aromatic polymer composition for use in making molded products comprising polymerizing in aqueous suspension an alkenyl aromatic monomer having mixed therein about 0.0005 to 0.05% by weight of a liquid organically di-substituted polysiloxane, the substituents of which are selected from the group consisting of alkyl radicals having 1 to 22 carbon atoms, the phenyl radical, the cyclohexyl radical, and mixtures of these, and a suspending agent, said suspending agent being added after the monomer and the polysiloxane are mixed; and introducing about 3.0 to 10.0% by weight of a volatile blowing agent at any stage of the process; the improvement comprising thoroughly washing the resulting expandable particulate product in an aqueous liquid.

2. The process of claim 1 wherein the aromatic polymer is comprised of at least 70% styrene and the polysiloxane is a methyl alkyl polysiloxane.

3. The process of claim 2 wherein the aromatic polymer is polystyrene and which contains 0.01 to 0.04% dimethyl polysiloxane.

4. The process of claim 3 wherein said polymerization is carried out in two stages and a second stage catalyst is added just before the second stage polymerization.

5. The process of claim 3 wherein a suspending agent is first added when at least 20% of the reaction mixture has been converted to polymer.

6. The process of claim 4 wherein the second stage polymerization is carried out at 95° to 140° C.

7. The process of claim 3 wherein said polymerization is carried out in two stages and first stage and second catalysts are added initially and the polysiloxane is methyl octyl polysiloxane.

8. The process of claim 1 wherein said expendable alkenyl aromatic polymer composition is a general purpose composition.

References Cited

UNITED STATES PATENTS

| | | | |
|---|---|---|---|
| 3,086,885 | 4/1963 | Vahn | 260—2.5 B |
| 3,224,984 | 12/1965 | Roper et al. | 260—2.5 B |
| 3,359,219 | 12/1967 | Ingram et al. | 260—2.5 B |

SAMUEL H. BLECH, Primary Examiner

M. FOELAK, Assistant Examiner

U.S. Cl. X.R.

260—85.5 HC, 855.5 S, 88.1 P, 88.2 C, 93.5 W, 827